May 21, 1946.  J. P. COLEY  2,400,811
TRACK CIRCUIT SIGNALING SYSTEM FOR RAILWAYS AND THE LIKE
Filed March 21, 1945
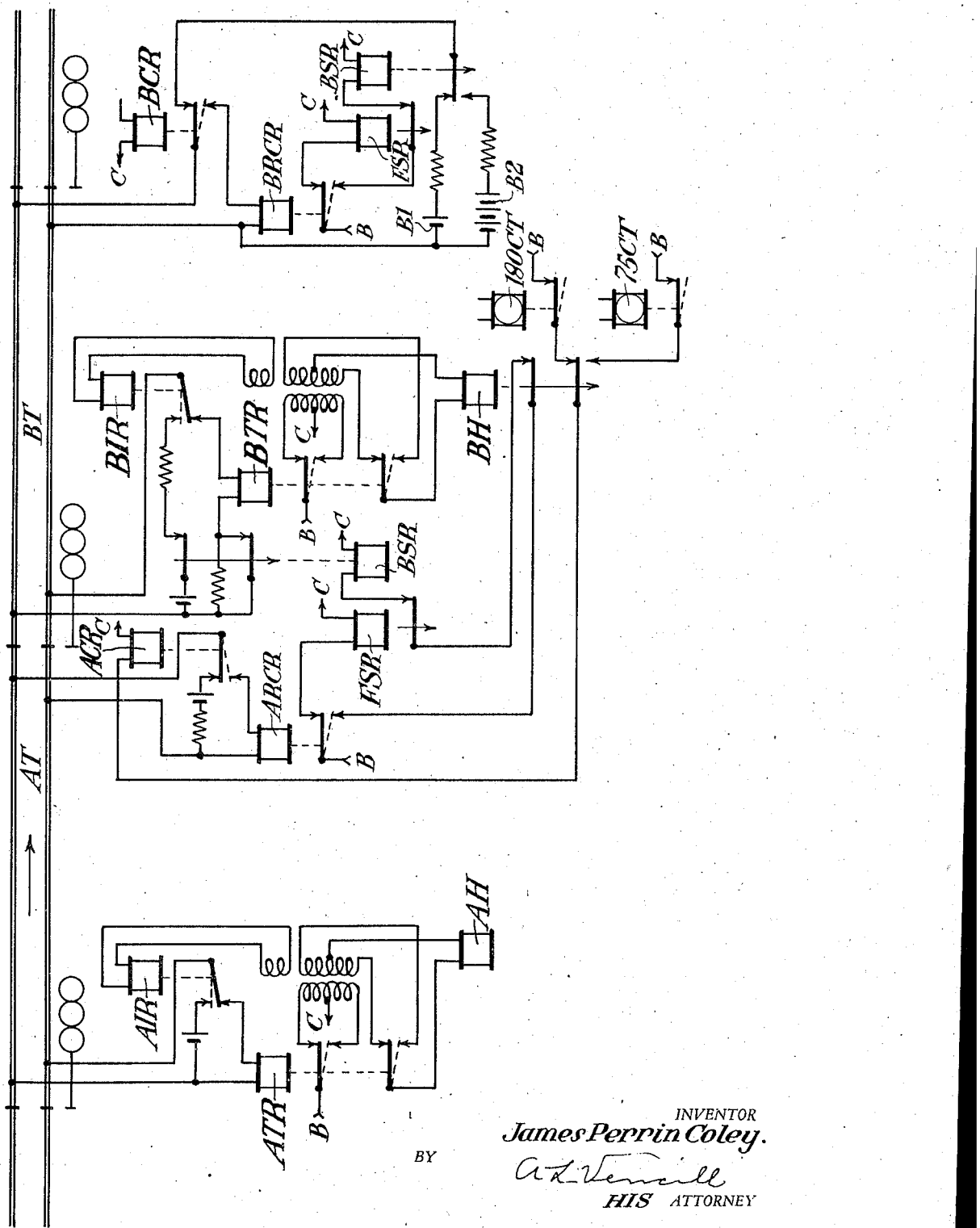
INVENTOR
James Perrin Coley.
BY
HIS ATTORNEY Patented May 21, 1946

2,400,811

UNITED STATES PATENT OFFICE 2,400,811

TRACK CIRCUIT SIGNALING SYSTEM FOR RAILWAYS AND THE LIKE

James Perrin Coley, London, England, assignor, by mesne assignments, to The Union Switch and Signal Company, Swissvale, Pa., a corporation of Pennsylvania Application March 21, 1945, Serial No. 583,915
In Great Britain May 26, 1944

5 Claims. (Cl. 246—38)

This invention relates to track circuit signaling systems of the kind in which the track rails of a section are arranged to be supplied with coded signaling current consisting of current impulses separated by intervals and more particularly to systems of this character in which during the code intervals a "return" code is transmitted to the track rails and serves to effect any desired control independently of the main code.

Owing to local geographical or climatic conditions the track rails of a particular section of a number of sections in a stretch of track (hereinafter termed the special section) for example, a section including a tunnel, may normally or occasionally require signaling current of an unusually high voltage to be applied to the rails to break down the resistance between the rails and the wheels of a train or vehicle in order to obtain a satisfactory train shunt when the section is occupied, particularly in the case of occupation by a single vehicle. Continuous operation at this high voltage would be uneconomical as regards current consumption and accordingly it has been previously proposed to cause the high voltage to be applied to the track rails of the section momentarily to prove the section unoccupied before clearing the signal controlling admission to the section.

According to the present invention signaling current of normal voltage is arranged to be supplied to the track rails of the special section so long as a relay, the energization of which is dependent upon the "return" code in the track circuit of another section, is energised, the release of this relay by a train or vehicle entering the other section being arranged to effect the application of a relatively higher voltage to the track circuit of the special section. This other section may be the section immediately preceding the special section or any other section in the rear and the application of the higher voltage is thus controlled by the approach of a train or vehicle at any desired distance from the special section.

The accompanying drawing is a diagrammatic view showing one form of apparatus embodying my invention.

The supply of master code energy to the rails of the special section BT is governed by a transmitter relay BCR which has a contact which is operated between two positions at a suitable code rate. When the contact of relay BCR is in its upper position, as shown, one or the other of the track batteries B1 or B2 is connected across the track rails to cause track circuit energy to be supplied over the track rails to pick up the contacts of the code following track relay BTR at the entrance end of section BT.

When the contact of the transmitter relay BCR is in its lower position the supply of energy from track battery B1 or B2 to the section rails is cut off, while the return code track relay BRCR is connected across the track rails so that it will respond to an impulse of return code supplied over the section rails from the entrance end of the section.

As a result of operation of the track relay BTR the two portions of the primary winding of the associated decoding transformer are alternately energized, thereby causing energy impulses to be induced in the transformer secondary windings. The energy from one of these windings is rectified by a contact of the track relay BTR and is supplied to a relay BH which controls the indications displayed by the signal governing entrance of traffic into section BT. The circuits by which relay BH controls the associated wayside signal may be arranged in any suitable manner well known in the art, so that this signal displays its stop indication when relay BH is released and so that this signal displays a permissive indication when relay BH is picked up.

In addition, the relay BH controls the circuit of the associated relay BSR, and also controls the supply of coded energy from the code transmitters 180CT and 75CT to the transmitter relay ACR which governs the supply of energy from a track battery to the rails of section AT and also governs connection of return code track relay ARCR with the rails of section AT.

Energy from the other secondary winding of the decoding transformer associated with track relay BTR is supplied to an impulse relay BIR which controls connection of track relay BTR across the rails of section BT and also controls the supply of impulses of return code energy to the rails of section BT. Impulses of energy of opposite polarity are supplied from the decoding transformer to relay BIR when the track relay BTR picks up and releases. The relay BIR is of a type the contact of which picks up only when energy of a particular polarity is supplied to the relay winding, and the various parts of the equipment are arranged so that energy of the polarity effective to pick up the contact of relay BIR is supplied to the relay on release of the track relay BTR, while the energy impulses supplied to the relay BIR are effective to keep the relay contact picked up only for an interval shorter than the shortest off period in the master code energy supplied over the section rails.

Similarly, the master code energy supplied to the rails of section AT as a result of operation of relay ACR operates track relay ATR to cause energy to be supplied through the associated decoding transformer to the relay AH and to the relay AIR. The relay AIR operates in substantially the same manner as relay BIR and on release of the track relay ATR the relay AIR picks up momentarily to cause an impulse of return code to be supplied over the section rails to operate relay ARCR. During the picked up periods of relay ARCR energy is supplied to the slow release relay FSR and its contact is closed so that during the released periods of the relay ARCR energy is supplied to the associated relay BSR if the relay BH is picked up.

Accordingly, as long as section AT is vacant so that track relay ATR is operated by master code energy supplied over the section rails, the relay AIR operates to supply an impulse of return code energy to the section rails to operate relay ARCR during each off interval in the master code energy supplied over the rails of section AT. As a result of operation of relay ARCR the associated relays FSR and BSR are picked up provided relay BTR is responding to master code energy so that relay BH is picked up. When relay BSR at the entrance end of section BT is picked up one of its contacts establishes the circuit of the battery from which return code energy is supplied to the section rails on picking up of relay BIR, while another contact of relay BSR shunts resistance in the circuit of the track relay BTR, to thereby render this relay responsive to master code energy of low voltage supplied from track battery B1.

As shown, relay BSR at the entrance end of section BT is picked up so that impulses of return code are supplied to the rails of section BT in the "off" intervals in the master code, and this energy operates relay BRCR. During the picked up periods of the relay BRCR energy is supplied to the associated slow release relay FSR and its contact is closed so that energy is supplied to the associated slow release relay BSR during the released periods of the relay BRCR. As relay BSR at the exit end of section BT is picked up the circuit of the high voltage track battery B2 is interrupted and the circuit of the low voltage track battery B1 is established. Accordingly, the master code energy supplied to the rails of section BT at this time is of low voltage, but is adequate to operate the track relay BTR since the resistance included in the circuit of the track relay BTR is shunted by a contact of the associated relay BSR.

When a train moving in the normal direction of traffic, that is, from left to right, enters section AT the track relay ATR is shunted and ceases to follow code while relay AIR ceases to supply impulses of return code energy to the rails of section AT. Accordingly, relay ARCR remains released and after a short time interval the associated relay FSR releases and interrupts the circuit of the associated relay BSR so that it releases, thereby interrupting the circuit of the battery from which return code energy is supplied to the rails of section BT and also interrupting the circuit shunting the resistance in the circuit of the winding of the track relay BTR so that this relay will now respond only to master code energy of high value.

When the supply of return code energy to the rails of section BT is cut off by reason of the interruption of the circuit of the battery from which this energy is supplied, the relay BRCR remains released and the associated relay FSR releases to interrupt the circuit of the associated relay BSR, and it releases. When this relay BSR releases the circuit of the low voltage track battery B1 is interrupted and the circuit of the high voltage track battery B2 is established so that the master code energy supplied to the track rails is of high voltage which is effective to operate the track relay BTR during the time in which the resistance is included in the circuit of the track relay.

The master code energy of high voltage supplied to the rails of section BT is more effective than the master code energy of low voltage in penetrating any film which may be present on the track rails. Accordingly, the master code energy is more readily shunted by a train in section BT than is the master code energy of low voltage, and if after the track relay BTR is conditioned to respond only to master code energy of high voltage code following operation of this relay continues, it is certain that section BT is not occupied and that it is proper for the signal at the entrance end of this section to authorize entrance of traffic into the section.

When the train under consideration advances into section BT the track relay BTR is shunted and ceases to follow code so energy is no longer supplied through the associated decoding transformer to relays BH and BIR. Accordingly, the relay BH releases and causes the signal at the entrance end of section BT to display its stop indication, while relay BIR remains released and will not establish the circuit for supplying impulses of return code to the rails of section BT.

On release of relay BH the frequency of the coded energy supplied to transmitter relay ACR is changed but this relay continues to operate to supply master code energy to the rails of section AT, and when this section is vacated this energy operates track relay ATR so that relay AIR again operates to supply impulses of return code energy to the rails of section AT. This energy operates relay ARCR to pick up the associated relay FSR, but at this time the associated relay BSR remains released since its circuit is interrupted by a contact of relay BH. As this relay BSR remains released the track relay BTR continues to be conditioned to respond only to master code energy of high voltage, and because of the high shunting sensitivity of the high voltage master code energy, the track relay BTR is certain to remain released as long as section BT is occupied. As relay BTR will not respond to coded energy as long as section BT is occupied, the relay BH remains released and holds the signal for section BT at stop and also interrupts the circuit of the associated relay BSR, thereby insuring that relay BSR remains released and conditions track relay BTR to respond only to energy of high voltage.

When section BT is vacated the track relay BTR responds to coded energy supplied over the section rails and relay BH picks up to complete the circuit for the associated relay BSR and it picks up to condition the track relay BTR to respond to master code energy of low voltage and to establish the circuit for supplying return code energy to the rails of section BT on picking up of relay BIR. The return code energy supplied to the rails of section BT operates relay BRCR to pick up the associated relays FSR and BSR to thereby change the master code energy supplied to the rails of section BT from high to low voltage, and the equipment again is in the condition in which it is shown in the drawing.

It will be evident that so long as the section AT is unoccupied the master code current is supplied to the section BT from the battery B1 at normal signaling voltage but in the event of a train or vehicle entering section AT, the master code current is supplied to the section BT from the battery B2 at a higher voltage than normal.

In addition, it will be evident that on entrance of a train into section AT the track relay BTR is conditioned to respond only to master code energy of high voltage and continues to be conditioned to respond only to this high voltage energy until the train vacates section BT. Accordingly, the operation of the track circuit for section BT with energy of high voltage, with the resultant increase in safety because of the increased shunting sensitivity of this high voltage energy, is initiated as soon as this increased safety is of value and is continued until it is certain that it is no longer necessary or beneficial.

It will be understod that control of the master code voltage applied to the special track section may be arranged to be effected by the entrance of a train or vehicle into any selected section preceding the special section.

The invention is evidently not limited to the particular arrangement and connections above described by way of example.

Having thus described my invention, what I claim is:

1. In combination, a stretch of railroad track divided into a first and a second track section through which traffic normally moves in the order named, a track relay for said second section governed by energy supplied over the section rails, and means governed by occupancy of said first and second sections for at times supplying energy of low voltage and at other times supplying energy of high voltage to the rails of said second section.

2. In combination, a stretch of railroad track divided into a first and a second track section through which traffic normally moves in the order named, a track relay for said second section governed by energy supplied over the section rails, means effective when said first and second sections are both vacant to connect a source of energy of low value across the rails of said second section, and means effective when either said first or said second section is occupied to connect a source of energy of high value across the rails of said second section.

3. In combination, a stretch of railroad track divided into a first and a second track section through which traffic normally moves in the order named, a track relay for said forward section governed by energy supplied over the section rails, means effective when said first and second sections are both vacant for rendering said track relay responsive to energy of low value and effective when either of said first or second sections is occupied for rendering said track relay responsive only to energy of high value, means effective when said first and second sections are both vacant to connect a source of energy of low value across the rails of said second section, and means effective when either said first or said second section is occupied to connect a source of energy of high value across the rails of said second section.

4. In combination, a stretch of railroad track divided into a forward and a rearward section, a code following track relay at the entrance end of said forward section, means for supplying impulses of master code energy to the rails of said forward section at the exit end thereof, means responsive to code following operation of said track relay provided said rearward section is vacant for supplying impulses of energy to the rails of said forward section at the entrance end thereof in the intervals between impulses of master code energy, and means at the exit end of said forward section governed by impulses of energy supplied over the section rails from the entrance end of the section for causing the impulses of master code energy to at times to be of one value and at other times to be of a substantially higher value.

5. In combination, a stretch of railroad track divided into a forward and a rearward section, a code following track relay at the entrance end of said forward section, means for supplying impulses of master code energy to the rails of said forward section at the exit end thereof, means effective when said track relay is responding to coded energy and said rearward section is unoccupied to render said track relay responsive to master code impulses of low value and effective when said track relay is not responding to coded energy or said rearward section is occupied to render said track relay responsive only to master code impulses of high value, means responsive to code following operation of said track relay provided said rearward section is vacant for supplying impulses of energy to the rails of said forward section at the entrance end thereof in the intervals between impulses of master code energy, and means at the exit end of said forward section governed by impulses of energy supplied over the section rails from the entrance end of the section for causing the impulses of master code energy to at times to be of one value and at other times to be of a substantially higher value.

JAMES PERRIN COLEY.